Aug. 23, 1938.　　　R. L. TAMERLANE　　　2,127,493

LOWER TUMBLER BEARING SEAL FOR SUBMERSIBLE BUCKET DREDGES

Filed Jan. 13, 1936　　　2 Sheets-Sheet 1

Inventor:-
Rex L. Tamerlane
by　　　　Attorney

Aug. 23, 1938.  R. L. TAMERLANE  2,127,493
LOWER TUMBLER BEARING SEAL FOR SUBMERSIBLE BUCKET DREDGES
Filed Jan. 13, 1936   2 Sheets-Sheet 2

Inventor:
Rex L. Tamerlane
by
Attorney.

Patented Aug. 23, 1938

2,127,493

UNITED STATES PATENT OFFICE 2,127,493

LOWER TUMBLER BEARING SEAL FOR SUBMERSIBLE BUCKET DREDGES

Rex L. Tamerlane, Portland, Oreg., assignor to Columbia Steel Casting Company, a corporation of Oregon Application January 13, 1936, Serial No. 58,802

2 Claims. (Cl. 308—36.1)

My invention relates to dredges adapted to be buoyantly supported upon the surface of a body of water. Dredges of this character are adapted to dig up mineral bearing earth underlying said body of water. They are used chiefly in obtaining gold but have similar use in mining other products lying close to the surface and underlying a body of water. The metal bearing earth is excavated and elevated by a series of buckets arranged in an endless line about a movable submersible boom. The boom and buckets together are termed a digging ladder. Said parts are subject to stresses of considerable extent in operation. These stresses result not only from the digging operations and the elevation of said materials onto said dredge but also from lateral thrusts exerted upon said boom by the lateral sweeps made by said digging ladder.

The lower end of said boom carries a tumbler about which the line of buckets moves and the lateral stresses exerted upon said boom are taken by said tumbler which tends to be shifted laterally in its bearings. Said tumbler is adapted to operate in many instances substantially below the surface of a body of water and is thus subject to the hydrostatic pressure of the water, actual physical burying of said tumbler beneath the surface of the earth being excavated, and is further subject to said lateral strains. Extreme difficulty is experienced in keeping the water and the dirt, which usually has an abrasive quality, from entering the bearings and quickly eroding the moving parts.

The object of my invention is to provide sealing means for the lower tumbler bearings which sealing means permit the tumbler to shift laterally under said strains but which effectively keeps out the dirty water and foreign materials. Said sealing means takes advantage of the hydrostatic pressure exerted upon said parts when operating in a substantial depth of water and said static head is utilized to keep said seal more tightly closed and thus resists the same pressure which would tend to force foreign materials into said bearings.

A further object of my invention is to provide means constituting a chamber or trap adapted to catch and hold quantities of foreign material tending to enter said bearings, which foreign materials also are caused to exert a pressure upon said seal to hold it closed more tightly.

Details of my invention and the operation thereof are hereinafter described with reference to the accompanying drawings in which.

A dredge to which my invention relates, comprises a buoyant hull $a$ adapted to be supported upon the surface of a body of water and anchored temporarily by a retractable spud $b$. A digging ladder $c$ is pivotally secured to the super structure of said hull, at one end of said ladder. The other end of said ladder is free and is moved in a vertical plane by rigging $d$. Power driven hoists $e$ are arranged upon the deck of the hull and operate the rigging. The hull with said ladder is also free to rotate about the spud to change the lateral position of said ladder with relation to the floor of the body of water which is being operated upon.

The digging ladder comprises a line of digging buckets $f$ arranged in endless form which extend about a boom $g$. The boom is a relatively stiff member and upon its free extremity carries a lower tumbler $h$ which serves as a guide about which the line of buckets passes. Said lower tumbler is rotatably mounted between two journal bearings $i$ and is carried by a hollow shaft $j$ which is journalled in said bearings $i$. Sealing plates $k$ extend across the outer faces of said two journal bearings and effectively seal the outer faces of the bearings against water and other foreign materials. A tie rod $l$ extends thru the bore of the hollow shaft and is provided with tightening nuts $l'$ and accessory devices for holding said plates tightly against the outer faces of the bearings.

Figure 1:
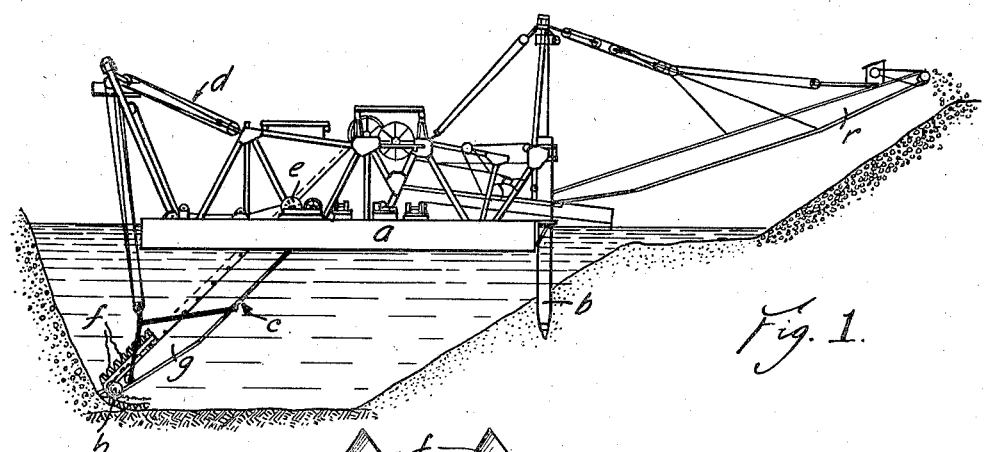
Fig. 1 is a more or less diagrammatic view of a dredge to which my invention relates, said figure diagrammatically illustrating its operation.
Figure 2:
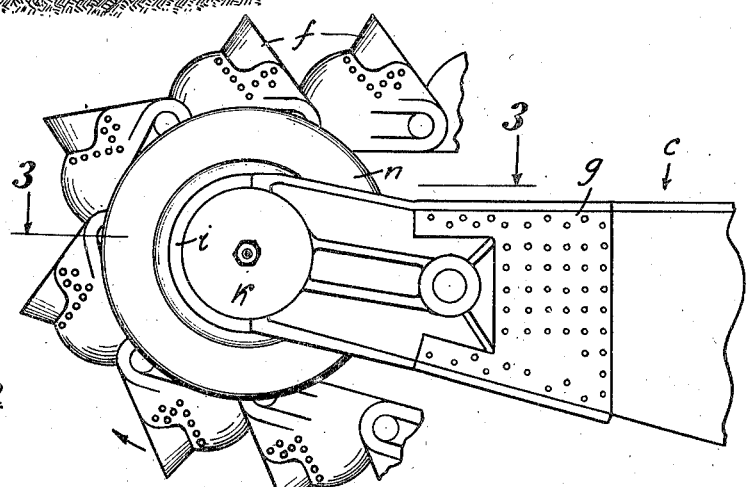
Fig. 2 is an enlarged fragmentary section of the lower end of the boom or digging ladder of said dredge showing the tumbler to which my invention specifically relates and a portion of the line of digger buckets.
Figure 3:
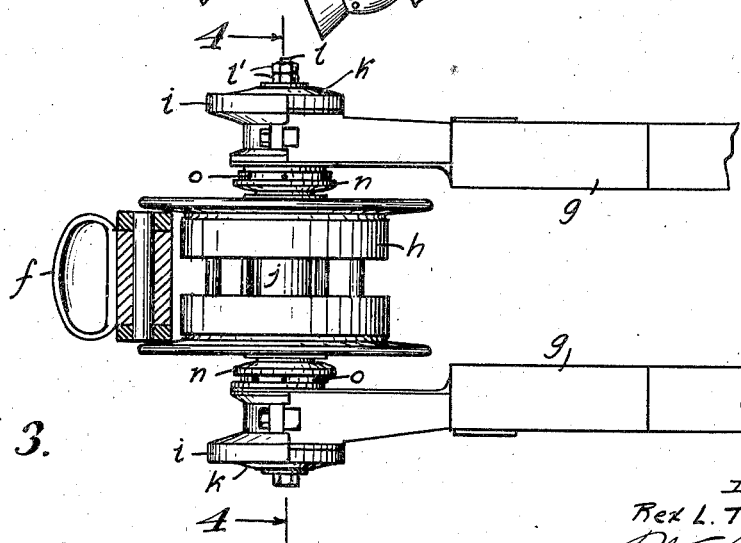
Fig. 3 is a plan section taken substantially on the line 3—3 of Fig. 2.
Figure 4:
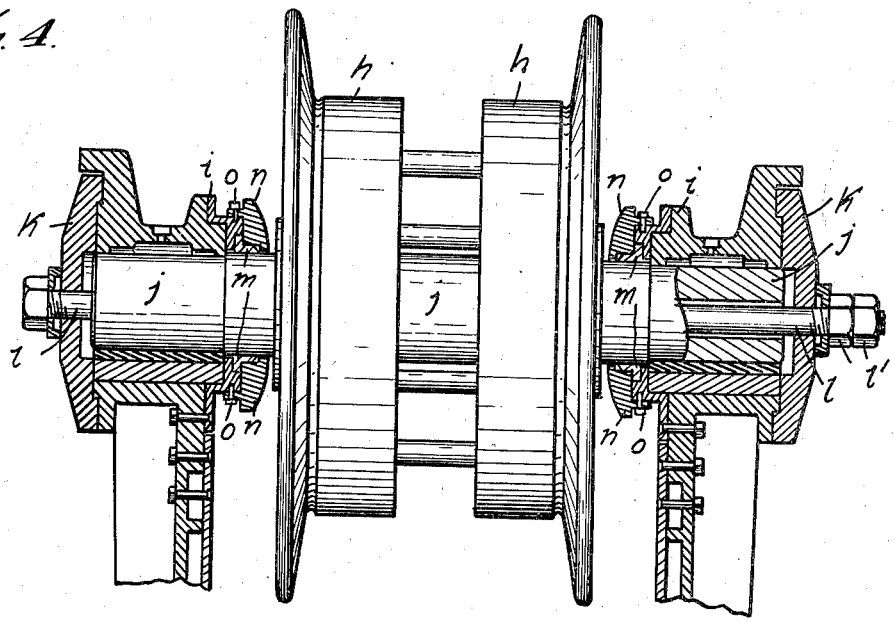
Fig. 4 is an enlarged detail view shown partly in section, taken on the line 4—4 in Fig. 3 showing broken sections of the journal bearings between which the lower tumbler is rotatably mounted.
Figure 5:
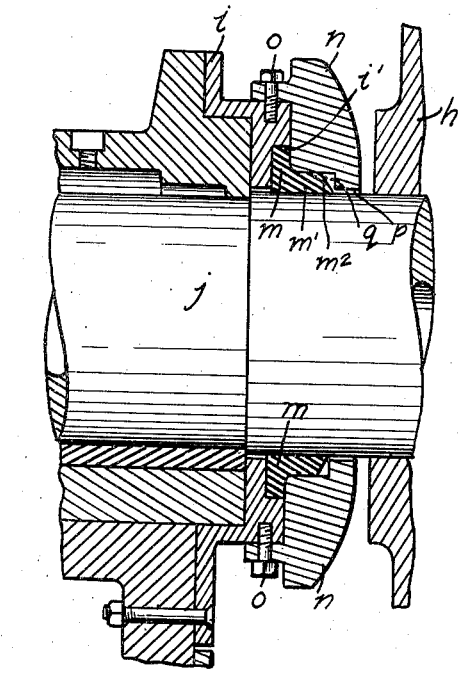
Fig. 5 is an enlarged section of a fragment of one of said journal bearings illustrating the sealing devices with which my invention is particularly concerned.
Figure 7:
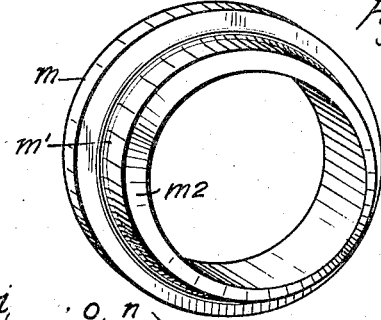
Fig. 7 is a perspective view of the sealing gasket.
Figure 6:
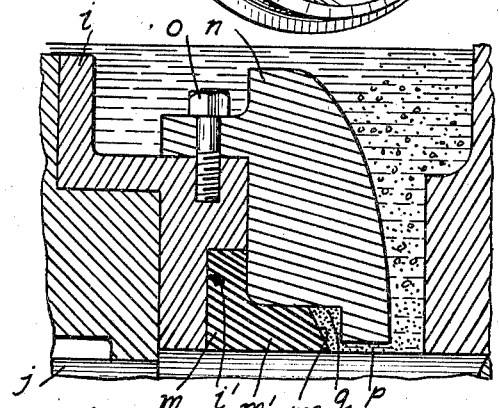
Fig. 6 is a still larger scaled section thereof which figure further illustrates the manner in which water and suspended foreign matter is adapted to be excluded, and illustrates how water and the accumulation of foreign materials bears against the exterior surface of the sealing gasket and tends to hold it more tightly sealed.

Sealing the inner faces of the bearings is the object of my invention. To accomplish this I provide a rubber gasket $m$ which fits into an annular recess $i'$ formed upon the inner face of the journal bearings. Said gasket elastically grips the shaft $j$. An annular cap $n$ overlies said gasket and holds it tightly against the journal bearings, respectively. One cap $n$ is secured to the inner face of each of the journal bearings by cap screws $o$. The gasket is L-shaped in section, as is shown in Figs. 4, 5 and 6, and is generally annular in form as is shown in Fig. 7. The laterally projecting portions $m'$ of the gasket lying adjacent the shaft $j$ underlies the cap $n$. The face $m2$ of said laterally projecting portion $m'$ is inclined obliquely to the axis of the shaft at and terminates in a relatively sharp edge on said shaft.

The interior face of the cap is relieved and the sloping face of the gasket and the relieved portion of the cap $n$ define a chamber $q$ of relatively substantial proportions in comparison to the area of the face $m2$. The cap $n$ does not fit tightly against the shaft $j$ but is spaced therefrom to define an annular passageway $p$ under the edge of said cap connecting the chamber $q$ to the exterior of the bearing, as is diagrammatically illustrated in Fig. 6. The water carrying suspended solids is thus free to pass under the edge of said cap thru said passageway and to be free to exert substantially the entire hydro-static pressure against the face $m2$ of the gasket.

The water usually carries a substantial percentage of solids and thus is free to pass into the interior of the journal bearings if it were not for the gaskets $m$. To pass into the interior of said journal bearings it would be necessary for the dirty water to pass between the gasket $m$ and the shaft $j$. The elasticity of the gaskets tends to resist this and it is further resisted by the pressure exerted upon the gasket by the cap $n$. The face $m2$ of the gasket is oblique and the hydrostatic pressure tends to push the gasket more tightly against the periphery of the shaft than would normally result if the face extended normal to the axis of said shaft. The pressure of the material to be excluded thus is utilized in part to prevent the movement of said fluid or semi-fluid material into the journal bearing where undue wear would result. The suspended solids in the water also tend to accumulate in the chamber $q$ and to be packed tightly therein by the pressure of the water and the lateral movement of the tumbler bearing upon its shaft. Said accumulated solids are more or less porous and do not seal out the pressure of the water from the face $m2$ of the gasket.

The lateral movement of the tumbler $h$ in its bearings $i$ is produced by the lateral forces resulting mainly from the shifting laterally of the digging ladder. The lateral shift of said tumbler produces a pumping action back and forth as play results from wear and from designed loose fit of the parts and said pumping action normally tends to draw into said bearings water on one side and tends to force the contents of the hollow bearings in the opposite direction. These forces are relieved by the hollow bore of the shaft which tends to permit the passage of the contents back and forth between the two bearings.

Lubricants, however, tend to obstruct the passageway. I have discovered, however, that if gaskets $m$ are provided that they exercise a greater seal to prevent the inflow of water into the bearings than is presented by the reverse flow of the air past the obstructed passageway induced by lubricant. The bearings must be adequately lubricated and said dredges operate in low temperatures and the lubricants are thus solidified to a greater degree than normal and in such hardened condition present a greater resistance than at normal temperatures, or when heated by friction or agitation.

The material excavated and elevated by the digging ladder is passed thru a series of separating mechanisms, consisting of washers, riffles and the like and the tailings are removed by a discharge ladder $r$ extending usually in the opposite direction to the digging ladder. These features are described to disclose the operating relation of the parts but are not shown in detail because they have no bearing upon my invention which relates only to means for sealing the lower tumbler barrel bearings.

I claim:

1. In lower tumbler bearing mechanism for digging machines, the combination with a hollow shaft journalled between two spaced bearings of means for forming a water and dirt tight seal about each of said bearings comprising a plate extending across one face of each of the journal bearings and the ends of said shafts, a tie rod extending thru the hollow bore of said shaft but spaced therefrom to leave a passageway therethru and a sealing gasket encompassing said shaft adjacent the other faces of said bearings respectively.

2. In lower tumbler bearing mechanism for digging machines, the combination with of means for forming a water and dirt tight seal about each of said bearings comprising a plate extending across one face of each of the journal bearings and the ends of the shafts, a tie rod extending thru the hollow bore of said shaft but spaced therefrom to leave a passageway therethru, and a sealing gasket elastically encompassing said shaft adjacent the other faces of said bearings, respectively, an annular cap overlying said sealing gasket, said cap being spaced from said shaft to define an annular passageway from the exterior of said gasket to the exterior of said bearing, the exterior face of said gasket terminating in a sloping relatively sharp edge and extending obliquely upwardly from the shaft, a chamber lying interiorly of said cap and exteriorly of said sloping face whereby the pressure of the water and the foreign matter contained therein tend to increase the sealing action between the sloping face of the gasket and the shaft.

REX L. TAMERLANE.